United States Patent
Takahashi et al.

(10) Patent No.: US 8,477,382 B2
(45) Date of Patent: Jul. 2, 2013

(54) APPARATUS AND METHOD FOR TRANSMITTING DATA IN A MULTI-CHANNEL SYSTEM

(75) Inventors: Akira Takahashi, Saitama (JP); Hirokazu Takahashi, Chiba (JP)

(73) Assignee: Texas Instruments Incorporated, Dallas, TX (US)

( * ) Notice: Subject to any disclaimer, the term of this patent is extended or adjusted under 35 U.S.C. 154(b) by 723 days.

(21) Appl. No.: 12/761,254

(22) Filed: Apr. 15, 2010

(65) Prior Publication Data

US 2011/0255136 A1    Oct. 20, 2011

(51) Int. Cl.
*H04N 1/36* (2006.01)

(52) U.S. Cl.
USPC ........... 358/412; 358/406; 358/409; 358/410; 358/474; 341/100; 370/916

(58) Field of Classification Search
USPC ............. 358/296, 300, 406, 409, 410, 412, 358/442, 445, 446, 474, 482, 483; 341/100; 347/249; 355/41; 348/294, 308, 323; 370/280, 370/294, 345, 434, 442, 458, 916
See application file for complete search history.

(56) References Cited

U.S. PATENT DOCUMENTS

| | | | |
|---|---|---|---|
| 4,916,551 A * | 4/1990 | Lin et al. | 358/483 |
| 6,204,910 B1 * | 3/2001 | Iwai | 355/41 |
| 6,600,577 B1 * | 7/2003 | Umezawa | 358/446 |
| 6,696,995 B1 | 2/2004 | Foley et al. | |
| 7,006,021 B1 | 2/2006 | Lombaard | |
| 7,250,885 B1 * | 7/2007 | Nairn | 341/141 |
| 7,342,520 B1 | 3/2008 | Katzman et al. | |
| 7,399,952 B2 * | 7/2008 | Kinoshita | 250/214 R |
| 2004/0032628 A1 * | 2/2004 | Sato et al. | 358/514 |
| 2005/0078339 A1 * | 4/2005 | Hori | 358/445 |
| 2005/0270597 A1 * | 12/2005 | Lin et al. | 358/515 |
| 2006/0176525 A1 * | 8/2006 | Mizuta et al. | 358/474 |
| 2007/0097226 A1 * | 5/2007 | Shida et al. | 348/222.1 |
| 2007/0170258 A1 * | 7/2007 | Kagami | 235/454 |
| 2008/0062292 A1 * | 3/2008 | Egawa et al. | 348/294 |
| 2008/0100888 A1 * | 5/2008 | Nagasaka | 358/514 |
| 2009/0021406 A1 * | 1/2009 | Zimmerman et al. | 341/118 |
| 2009/0259781 A1 | 10/2009 | Padaparambil | |
| 2010/0141822 A1 * | 6/2010 | Xue | 348/332 |
| 2010/0171998 A1 * | 7/2010 | Nakazawa | 358/482 |
| 2012/0218610 A1 * | 8/2012 | Kunii et al. | 358/445 |

\* cited by examiner

*Primary Examiner* — Kimberly A Williams
(74) *Attorney, Agent, or Firm* — Alan A. R. Cooper; Wade J. Brady, III; Frederick J. Telecky, Jr.

(57) ABSTRACT

Conventional analog front ends or AFEs for scanners are implemented using multiple integrated circuits or ICs. As a result, there is typically a problem of skew (due at least in part to manufacturing process variations) for these different ICs in the AFE. Here, an AFE is provided which serializes input data so as to compensate for skew.

19 Claims, 15 Drawing Sheets

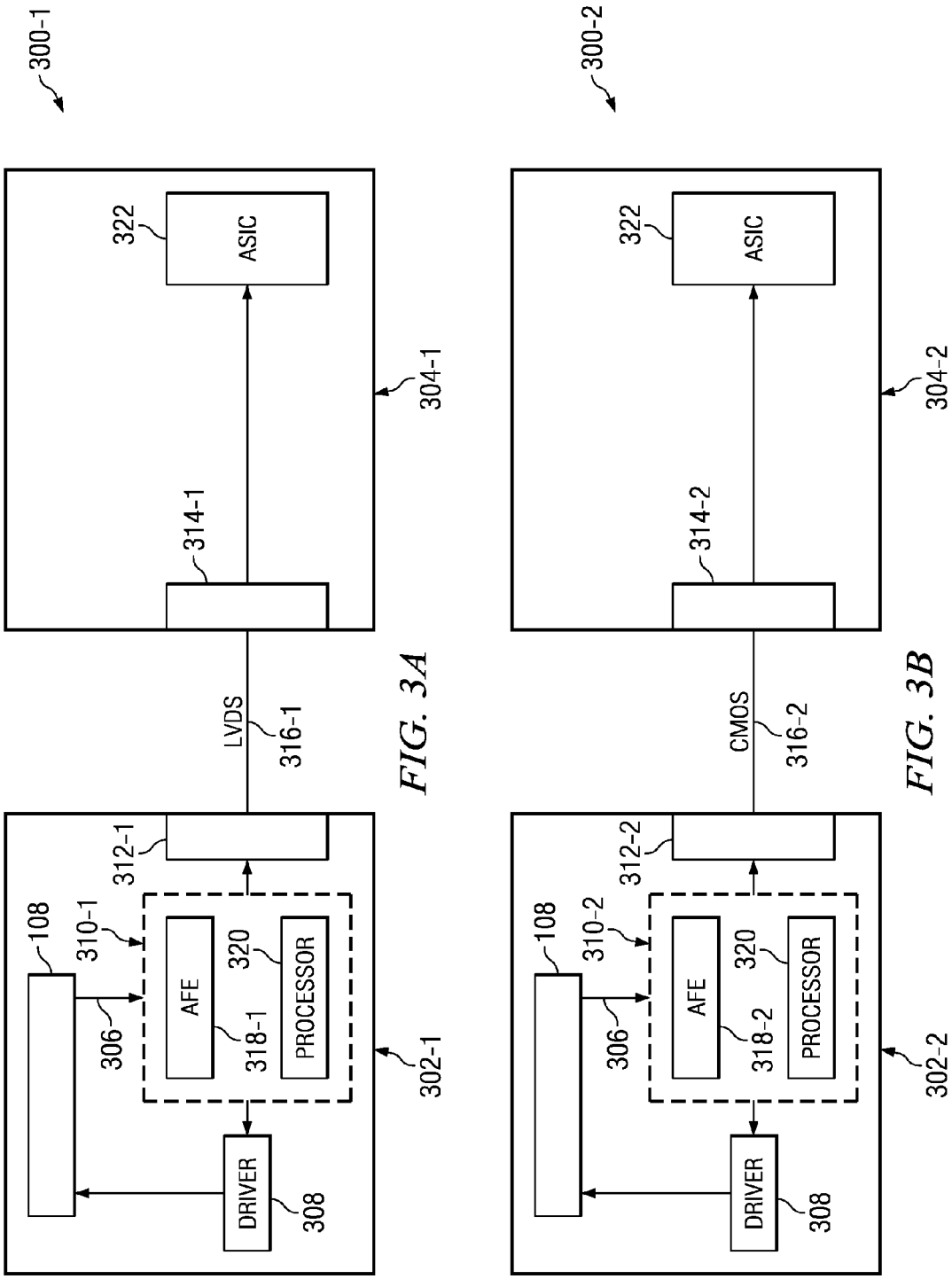

APPARATUS AND METHOD FOR TRANSMITTING DATA IN A MULTI-CHANNEL SYSTEM

TECHNICAL FIELD

The invention relates generally to multi-channel systems and, more particularly, to reducing skew in multi-channel systems.

BACKGROUND

Referring to FIGS. 1A and 1B of the drawings, the reference numeral 100 generally designates a conventional bed scanner. Scanner 100 generally comprises a housing 118 that includes a translucent or transparent sheet 112, which is commonly referred to as "scan glass." Below the sheet 112, there is a carriage 102, which is mounted on a track 120, that moves between initial and final positions. As the carriage 102 moves between the initial and final positions, the light source 104 transmits light through sheet 102. Light is then reflected off the scanned item along the optical axis 110 (through lens array 106) to image sensor 108 (which is generally a CMOS or charged coupled device (CCD) sensor array).

Turning to FIG. 1C, one line of sensor 108 is shown. This line includes sensors 114-1 to 114-L that are sensitive to red, blue, and green wavelengths of visible spectrum (which are commonly used in color scanners). Each of these sensors 114-1 to 114-L is coupled to one of the drivers 116-1 to 116-L so as to generate output signals OUT1 to OUTL.

Generally, the sensor 108 is divided in to several parts or sections where each part or sections includes several sensors (such as sensor 114-1). Typically, there are M parts or sections that include N sensors. As shown in FIG. 2, each of the M parts of section is associated with one of the input devices 202-1 to 202-M (where each has N channels) of processing circuitry 200. These input devices 202-1 to 202-M are typically N-channel analog front ends or AFEs that generate signals for a processing unit or processor 204. Because each of the input devices 202-1 to 202-M is a separate integrated circuit or IC (where each has some differences due to manufacturing process variations), there is skew between the inputs to the processing unit 204. Thus, there is a need for a method and/or apparatus that compensates for skew.

Some examples of conventional circuits are: U.S. Pat. Nos. 6,696,995; 7,006,021; 7,342,520; U.S. Patent Pre-Grant Publ. No. 2009/0259781.

SUMMARY

A preferred embodiment of the present invention, accordingly, provides an apparatus. The apparatus comprises an image sensor; and an analog front end (AFE) having: a first AFE unit that is coupled to the image sensor through a first set of channels, wherein the first AFE unit outputs a first AFE data packet for each of the first set of channels during each cycle of a clock signal; and a second AFE unit that is coupled to the image sensor through a second set of channels and that is coupled to the first AFE unit, wherein the second AFE unit outputs the first AFE data packet for each of the first set of channels and a second AFE data packet for each of the second set of channels during each cycle of the clock signal.

In accordance with a preferred embodiment of the present invention, the clock signal further comprises a system clock signal, and wherein the first AFE unit outputs the first AFE packet for each of the first set of channels within the one cycle of a first clock signal, and wherein the second AFE unit outputs the second AFE packet for each of the second set of channels within the one cycle of a second clock signal, and wherein the first and second clock signals having frequencies that are integer multiples of the frequency of the system clock signal.

In accordance with a preferred embodiment of the present invention, the first and second AFE units further comprise first and second integrated circuits (ICs).

In accordance with a preferred embodiment of the present invention, the contact image sensor, the first AFE unit, and the second AFE unit are secured to a scanner board.

In accordance with a preferred embodiment of the present invention, the apparatus further comprises: a processor that is coupled to the AFE and that is secured to the scanner board; a driver that is coupled to the contact image sensor, that is coupled to the processor, and that is secured to the scanner board; and a communication port that is coupled to at least one of the AFE and processor and that is secured to the scanner board.

In accordance with a preferred embodiment of the present invention, the communication port further comprises a first communication port, and wherein the apparatus further comprises: a second communication port that is secured to a main board; a third IC that is coupled to the second communication port and that is secured to the main board; and a communication channel that is coupled to the first and second communication ports.

In accordance with a preferred embodiment of the present invention, low voltage differential signal (LVDS) transmissions are provided over the communication channel.

In accordance with a preferred embodiment of the present invention, CMOS transmissions are provided over the communication channel.

In accordance with a preferred embodiment of the present invention, an apparatus is provided. The apparatus comprises an image sensor; and an AFE having a plurality of AFE units coupled in series with one another in a sequence, wherein each AFE has a set of channels, and wherein each AFE unit is coupled to the image sensor through its set of channels, and wherein each AFE unit outputs an AFE data packet for each of its channels and an AFE data packet from each channel of each preceding AFE unit in the sequence during each cycle of a clock signal.

In accordance with a preferred embodiment of the present invention, a method is provided. The method comprises receiving analog image data at each channel of a plurality of AFEs, wherein the plurality of AFEs are coupled in series with one another in a sequence, and wherein the last AFE of the sequence is coupled to an IC; outputting, at about the same time, an AFE data packet from each AFE, corresponding to its first channel, to at least one of a subsequent AFE in the sequence and the IC; and repeating the step of outputting for of the remaining channels of each AFE such that the AFE data packet for each channel of each AFE is output to the IC within one cycle of a clock signal.

In accordance with a preferred embodiment of the present invention, the clock signal is a system clock signal, and wherein the method further comprises generating a plurality of output clock signals, wherein the frequency of each output clock is an integer multiple of frequency of the system clock signal, and wherein each clock signal is associated with at least one of the AFEs.

In accordance with a preferred embodiment of the present invention, each AFE data packet is output from its corresponding AFE within one clock cycle of the output clock signal of its corresponding AFE.

In accordance with a preferred embodiment of the present invention, the step of outputting further comprises outputting, substantially simultaneously, the AFE data packet from each AFE, corresponding to its first channel, to at least one of a subsequent AFE in the sequence and the processor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3A through 3C are block diagrams of examples of systems for a scanner in accordance with a preferred embodiment of the present invention;

DETAILED DESCRIPTION

Figure 1A:
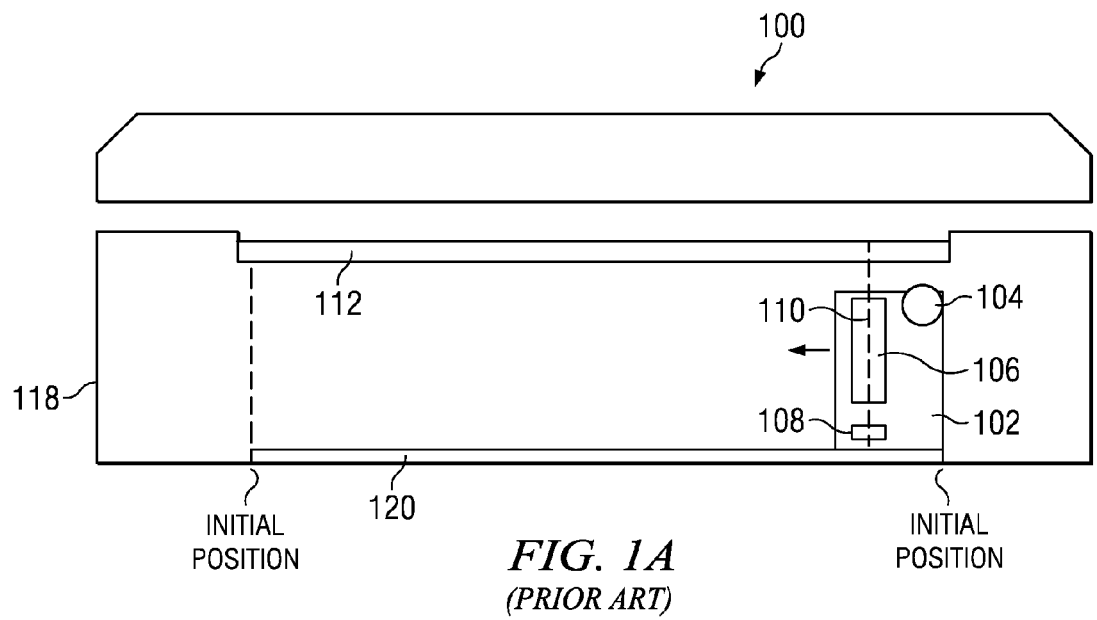
FIGS. 1A through 1C are diagrams of a conventional scanner.
Figure 1B:
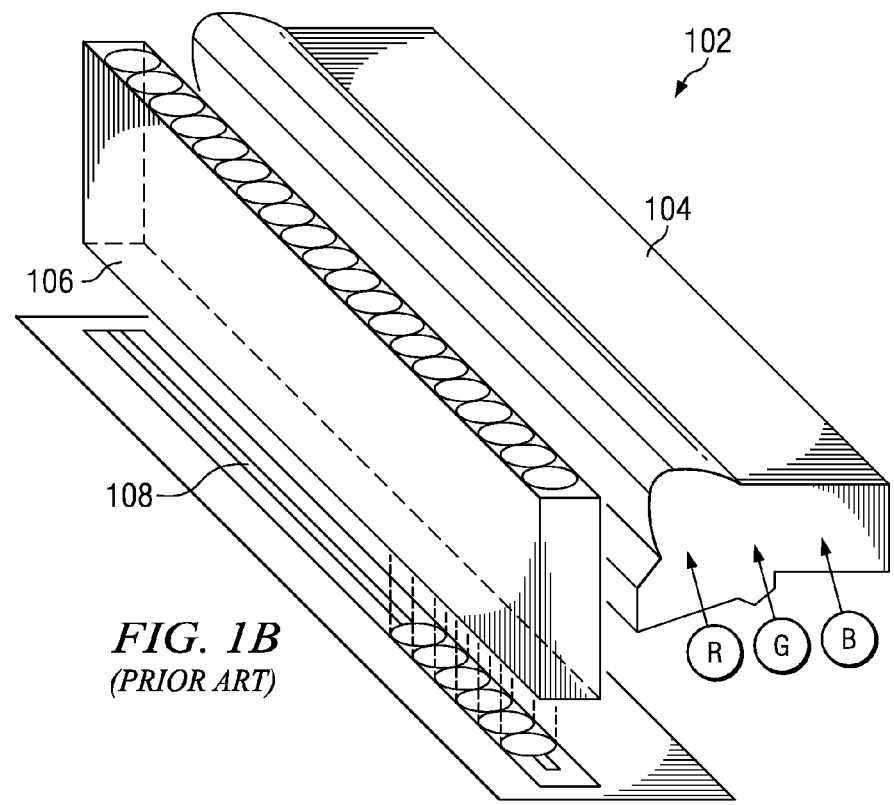
Figure 1C:
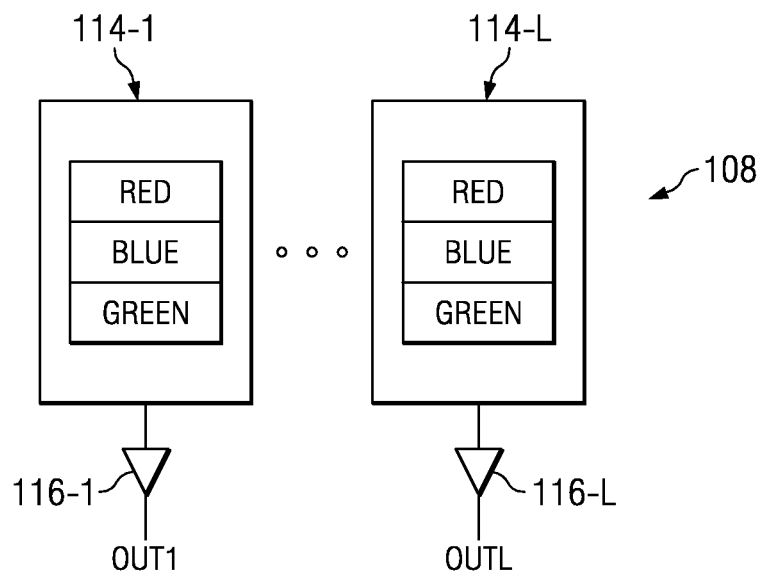
Figure 2:
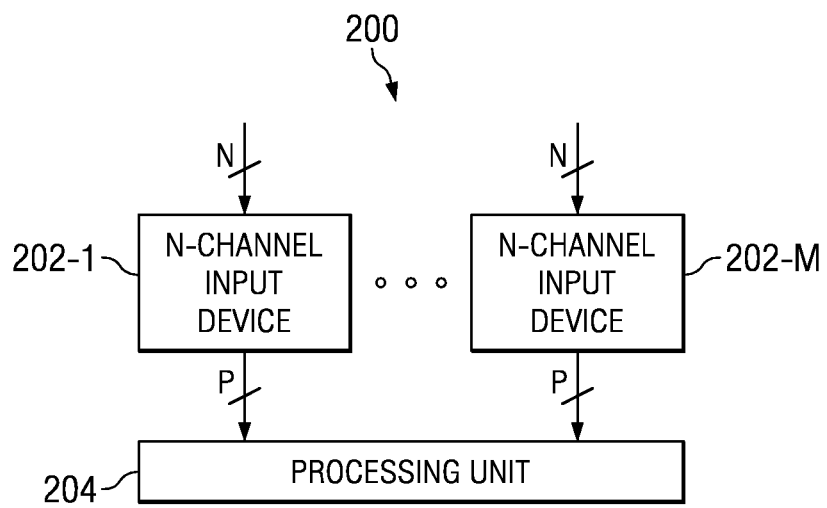
FIG. 2 is a block diagram of a processing circuitry for the scanner of FIG. 1.

Refer now to the drawings wherein depicted elements are, for the sake of clarity, not necessarily shown to scale and wherein like or similar elements are designated by the same reference numeral through the several views.

Turning to FIG. 3A, system 300-1 can be seen. In system 300-1, there is a scanner board 302-1 (which is typically secured to a carriage, like carriage 102) and a main board 304-1 (which is typically secured to a housing, like housing 118), which communicate with one another over communication channel 316-1. In system 300-1, communication channel 316-1 enabled low voltage differential signals (LVDS) to be transmitted between boards 302-1 and 304-1.

Each of board 302-1 and 304-1 generally include several components that are employed for image processing. In particular, board 302-1 generally comprises image sensor 108, driver 308, processing circuitry 310-1, and output port 312-1. Typically, in operation, image sensor 108 provides analog data over communication channel 306. Preferably, communication channel 306 has 24 channels. This analog data is received by analog front end (AFE) 318-1 (which typically comprises 4 AFE integrated circuits of ICs with 6 analog channels each). The AFE 318-1 converts the data into digital data for further processing by processor 320. Processing circuitry 310-1 is then able to provide further controls and/or communications to driver 308 and output port 312-1. Board 304-1 includes a port 314-1 (which receives LVDS signals from port 312-1) and an application specific integrated circuit or ASIC 322.

Turning to FIG. 3B, a system 300-2 can be seen which is similar to system 300-1. Some differences are, however, that AFE 318-2 (and processing circuitry 310-2), port 312-2, communication channel 316-2, and port 314-2 communicate with one another with CMOS signals instead of LVDS signals.

Figure 3C:
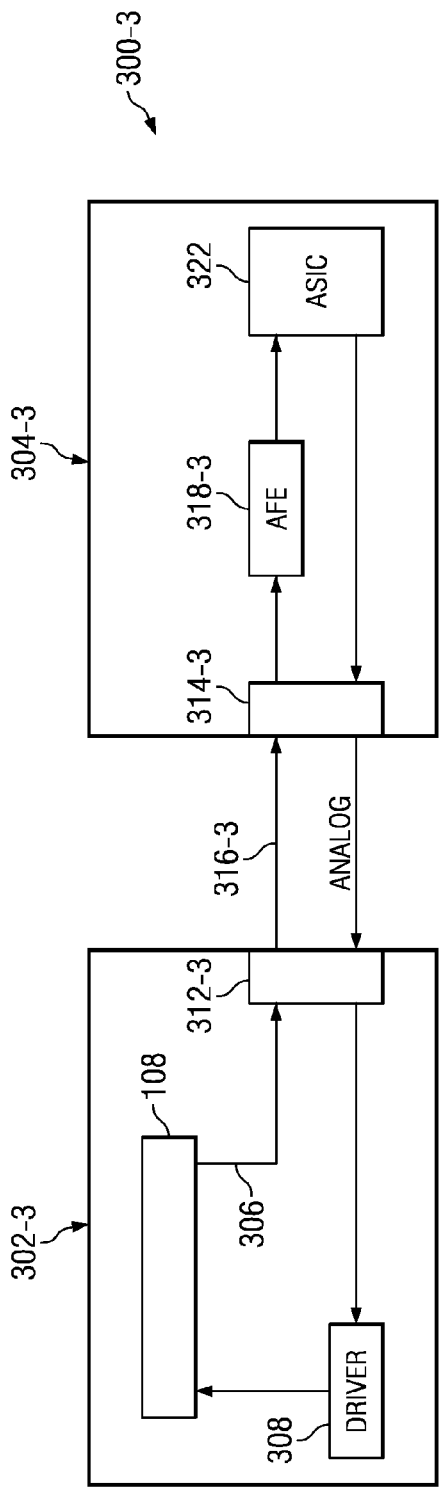

In FIG. 3C, the configuration of system 300-3 is very different from systems 300-1 and 300-2. In particular, image sensor 108 employs port 312-3 to provide analog signals to main board 304-3 over communication channel 316-3. AFE 318-3 is secured to main board 304-3 and is coupled to port 314-3 and ASIC 322. Here, AFE 318-3 has the same general function as AFEs 318-1 and 318-2.

Figure 4:
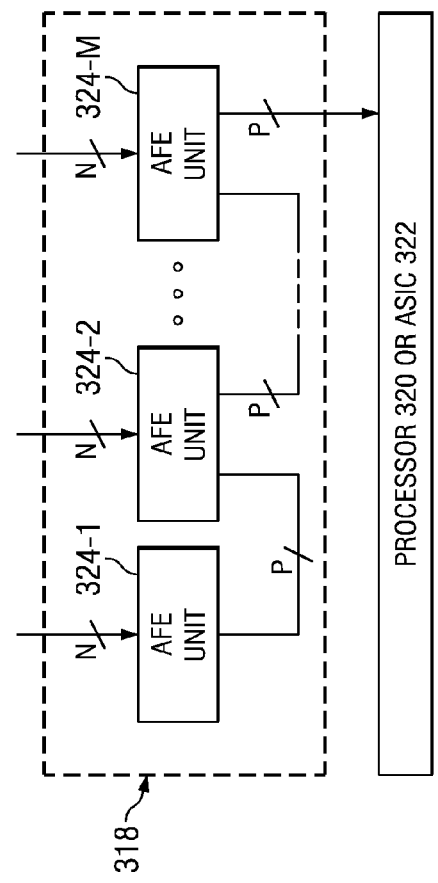
FIG. 4 is a block diagram of processing circuitry for the systems of FIGS. 3A through 3C.

AFEs have previously been used in many systems, but AFEs 318-1, 318-2, and 318-3 (hereinafter referred to as AFE 318) has a different configuration. Specifically, as shown in FIG. 4, AFE 318 has several AFE units 324-1 through 324-M coupled in series with one another in a sequence. In operation, each of these AFE units 324-1 through 324-M (which each have N channels) receive analog data from an image sensor (like image sensor 108), but the final AFE unit 324-M of the sequence is in communication with the processor 320 or ASIC 322.

Figure 5:
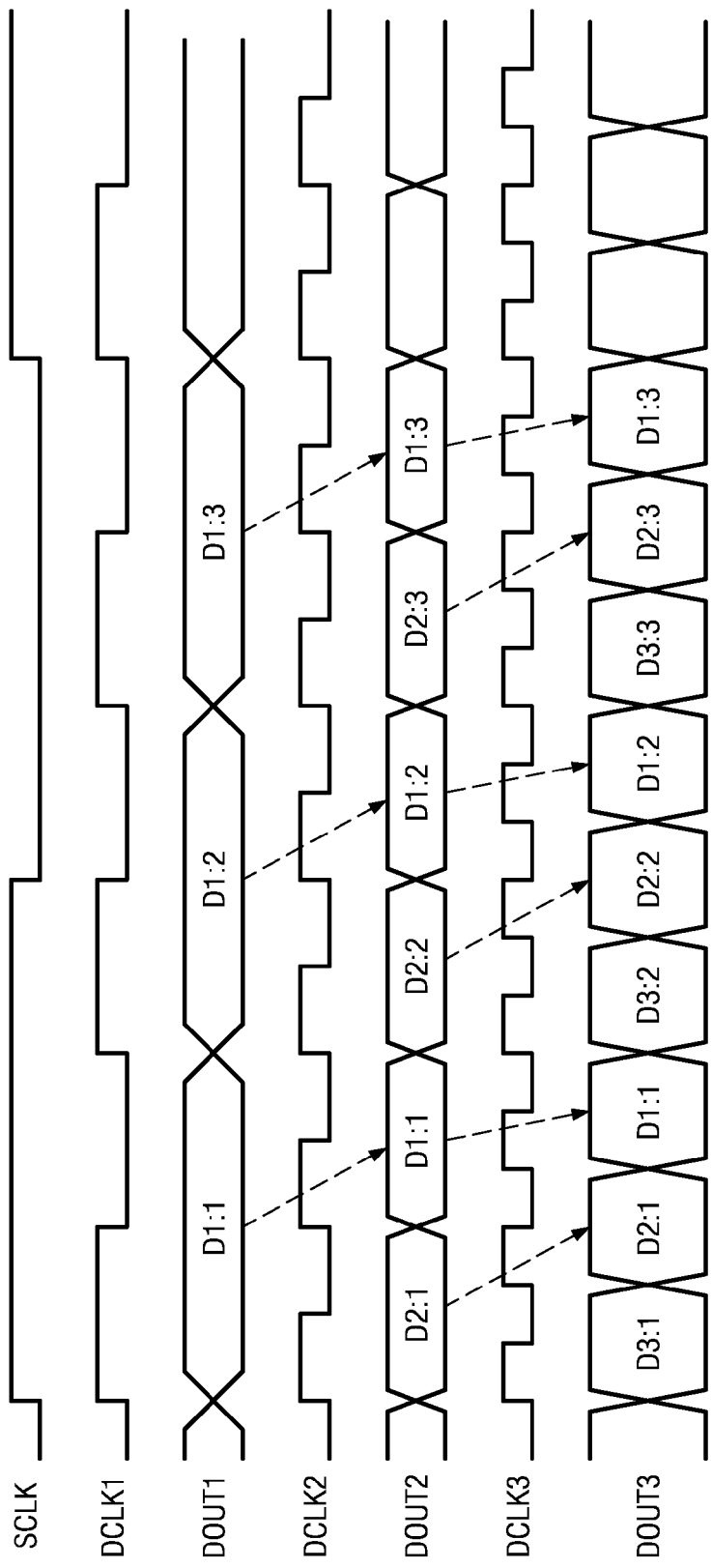
FIG. 5 is an example of a timing diagram for the processing circuitry of FIG. 4.

Turning to FIG. 5, an example of the operation of AFE 318 of FIG. 5 can be seen. In this example, it is assumed that there are three AFE units (M=3) that each have three channels (N=3). As shown, there is a system clock signal SCLK and three output clock signals DCLK1, DCLK2, and DCLK3 (which are each associated with one of the three AFE units). These output clock signals DCLK1, DCLK2, and DCLK3 have a frequency that is an integer multiple of the frequency of the system clock SCLK (but not aligned with the system clock SCLK); in this example, output clock signals DCLK1, DCLK2, and DCLK3 have frequencies that are 3, 6, and 9 times the frequency of the system clock.

In operation, the timing of the system is dependant on the both the number of channels for each AFE unit and the number of AFE channels. In particular, AFE data packets (i.e., D1:1, which corresponds to the first channel of the first AFE unit) for each channel are output from the AFE 318 within one cycle of the system clock signal SCLK. In this example, AFE data packets the first channel of each AFE unit is output either to a subsequent AFE unit or the processor 320 (or ASIC 322) substantially simultaneously (shown with output signals DOUT1, DOUT2, and DOUT3). Within one cycle of the output clock signal DCLK1, data packets for the first channel of each of the AFE units D3:1, D2:1, and D1:1 are output from the last AFE unit in the sequence to the processor 320 (or ASIC 322). This process is repeated until the data packets for each channel of each AFE unit is output to the processor 320 (or ASIC 322), which is accomplished within one cycle of system clock signal SCLK.

Figure 6A:
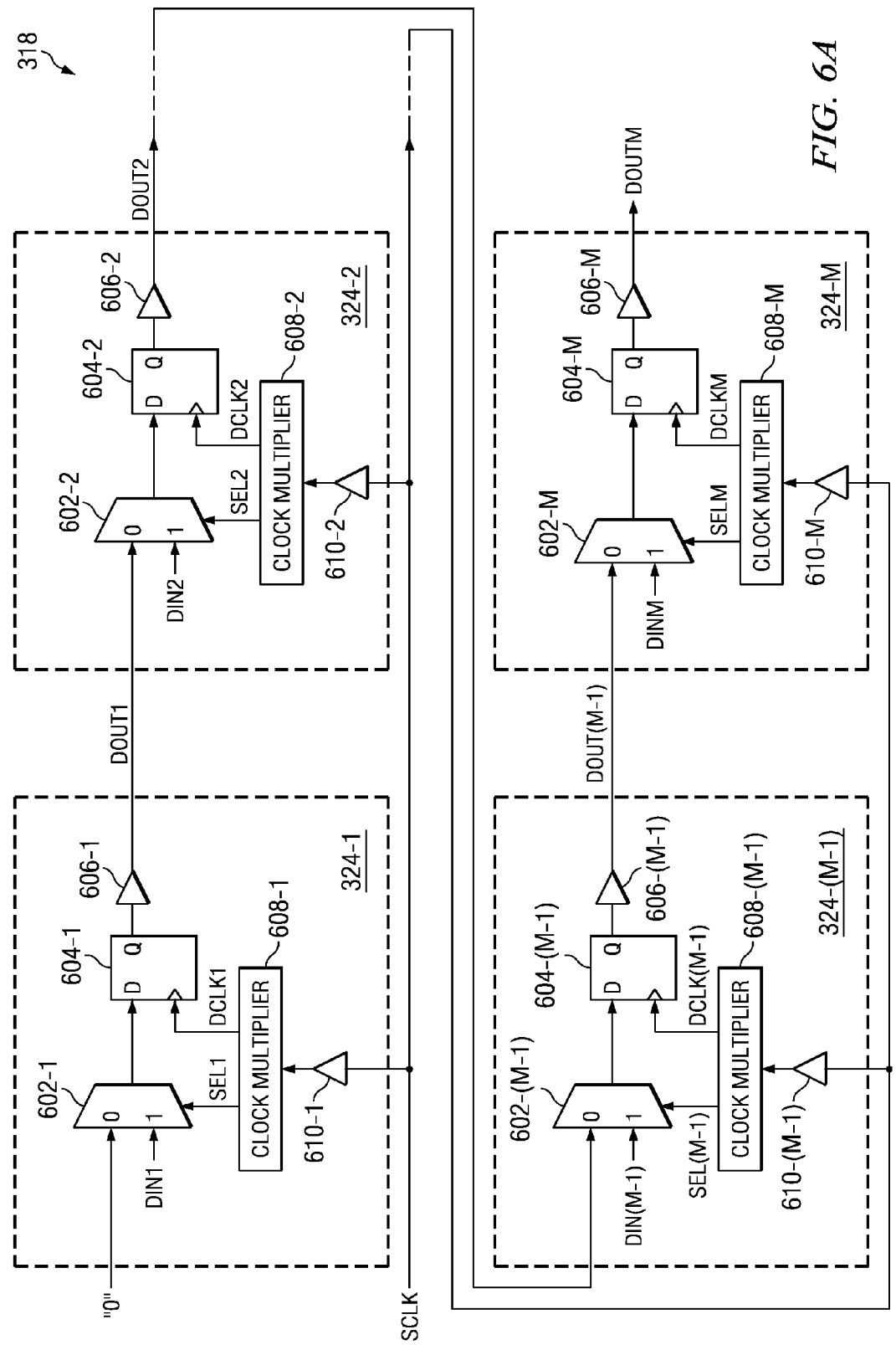
FIG. 6A is a circuit diagram of an example of the analog front end (AFE) of FIGS. 3A through 3C.

Turning now to FIG. 6A, a circuit diagram of example of the AFEs 318-1, 318-2, and 318-3 of FIGS. 3A through FIG. 3C (hereinafter referred to as AFE 318) can be seen. In AFE 318 of FIG. 6A, there several AFE units 324-1 through 324-M that have a substantially similar configuration and are coupled in series with one another. Looking to AFE units 324-1 to 324-M each clock multiplier 608-1 to 608-M receives the clock signal SCLK (which is delayed by delay elements 610-1 to 610-M, respectively) to generate a select signal SEL1 to SELM, respectively, and an output clock signal DOUT1 to DOUTM, respectively. The select signals SEL1 to SELM control their respective multiplexers 602-1 to 602-M, which output their respective input signal DIN1 to DINM with a "1" or the previous output signal DOUT1 to DOUT (M-1) with a "0". D flip-flops 604-1 to 604-M receive the output from their respective multiplexers 602-1 to 602-M and are clocked by their respective output clock signals DCLK1 to DCLKM. The output from each D flip-flop 604-1 to 604-M is then delayed by delay element 606-1 to 606-M, respectively.

Figure 6B:
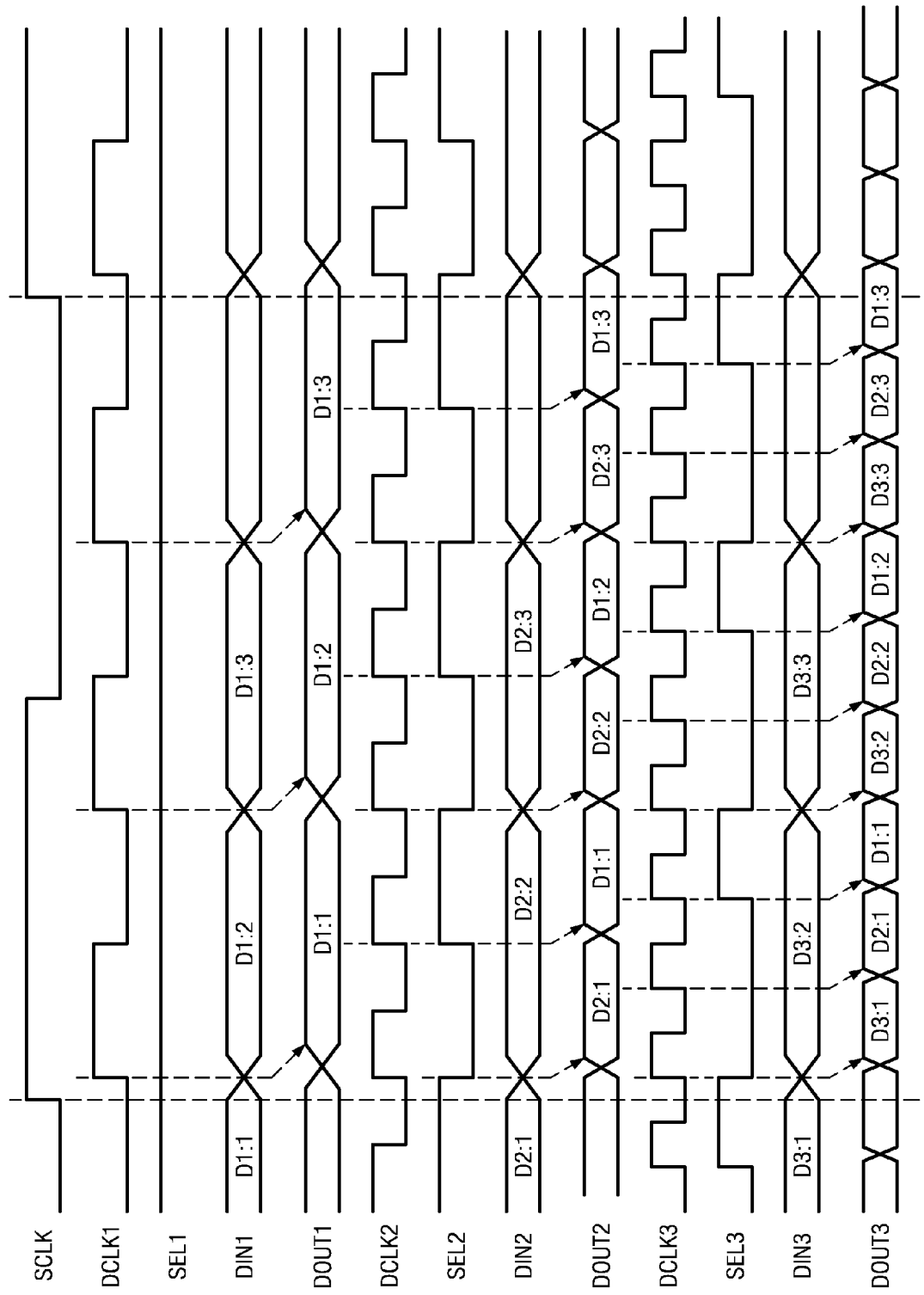
FIG. 6B is a timing diagram for the AFE of FIG. 6A.

As can be seen in FIG. 6B, the operation of the AFE 318 of FIG. 6A is substantially similar to the operation of the AFE 318 of FIG. 5; however, one difference is the use of the select signals SEL1 to SEL3. These select signals SEL1 to SEL3 are used to control multiplexers (i.e., 602-1, 602-2, and 602-3) and select between the input signals DIN1 through DIN3 and the output DOUT1 and DOUT2 from the previous AFE units. For the first AFE unit, select signal SEL1 is logic high "1" so that the output because there is no previous AFE unit. Select signals SEL2 and SEL3 are aligned with their respective output clock signals DCLK2 and DCLK3 and each has a frequency that is an integer multiple division (i.e., ½ or ⅓) of their respective output clock signals DCLK2 and DCLK3.

Figure 7A:
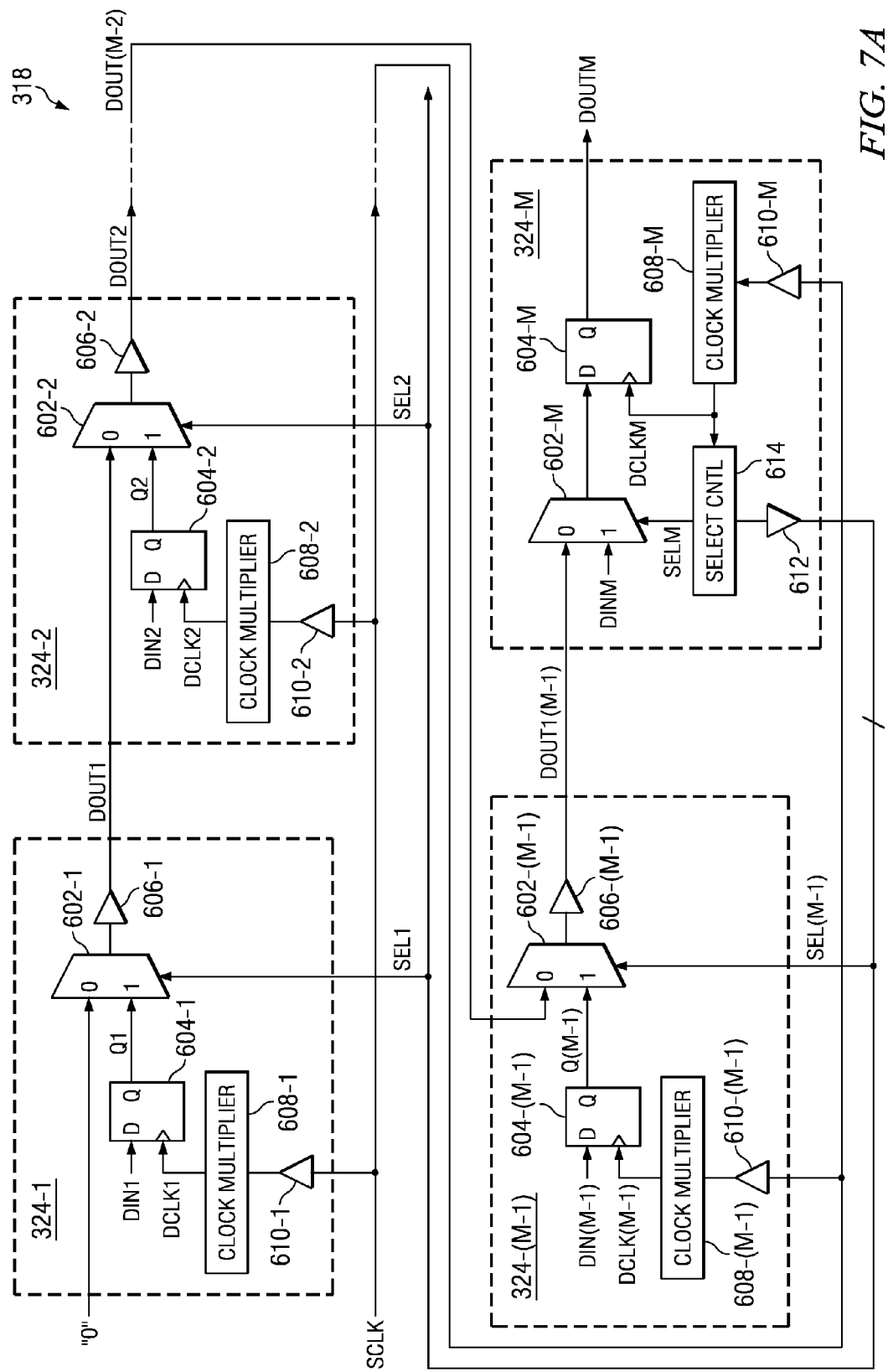
FIG. 7A is a circuit diagram of an example of the AFE of FIGS. 3A through 3C.
Figure 7B:
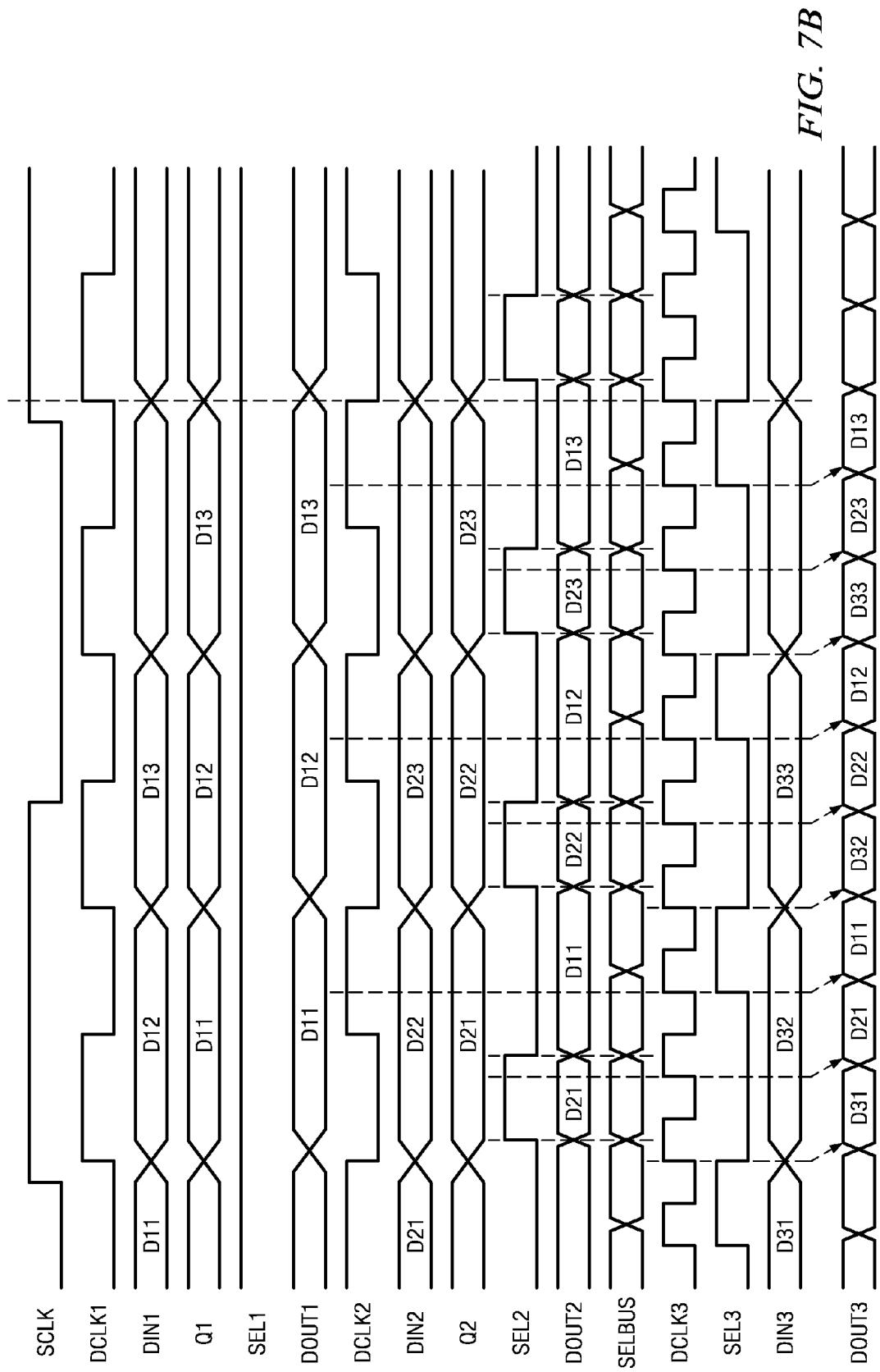
FIG. 7B is a timing diagram for the AFE of FIG. 7A.

Turning to FIGS. 7A and 7B, another example of AFE 318 of FIGS. 3A through 3C can be seen. In this example, the configuration of the AFE units 324-1 to 324-(M-1) of FIG. 7A are similar to the AFE units 324-1 to 324-M of FIG. 6A, but, in FIG. 7A, D flip-flops 604-1 to 604-(M-1) precede their respective multiplexers 606-1 to 606-(M-1). Additionally, select signals SEL1 to SELM are provided from AFE unit 324-M, namely select controller 614. The controller 614 generates select signals SEL1 to SELM, and outputs these signals as SELBUS in FIG. 7A. When SEL1 is logic high or "1", then AFE unit 324-M captures data from the input signal DIN1 through each multiplexer (i.e., 602-1 to 602-M). When select signal SEL2 is logic high or "1" and select signals SEL3 to SELM are logic low or "0", then AFE unit 324-M captures data from the input signal DIN2. The AFE unit 324-M can select data from input signals DIN1 to DINM by controlling select signals SEL1 to SELM. In FIG. 7B, input signals DIN1 to DIN3 are registered in D flip-flops 604-1 to 604-3 by setting SEL2 to logic high. After registering data from AFE 324-2, the AFE unit 324-3 selects the AFE 324-1 data by setting SEL2 to logic low. By changing SELBUS by the controller 614, AFE unit 324-M output each AFE data to the processor 320 (or ASIC 322) substantially simultaneously.

Figure 8A:
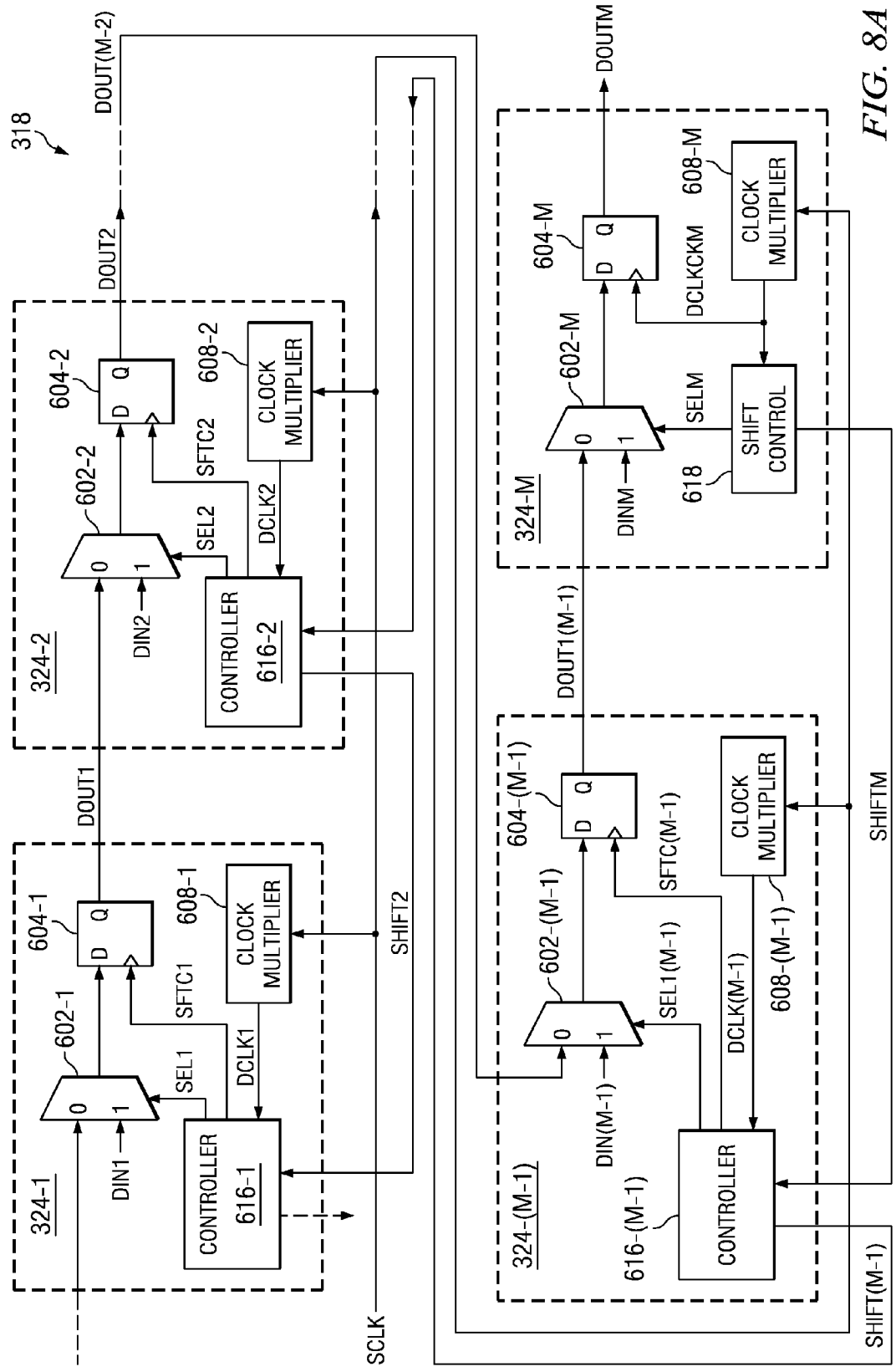
FIGS. 8A through 8C are circuit diagrams of an example of the AFE of FIGS. 3A through 3C.

Turning to FIGS. 8A, another example of an AFE 318 of FIGS. 3A through 3C. In this configuration, AFE units 324-1 to 324-(M-1) employ a controller 616-1 to 616-(M-1) to control multiplexer 602-1 to 602-(M-1) and D flip-flop 604-1 to 604-(M-1). AFE unit 324-M employs shift controller 618 that provides a shift signal SHIFTM to the previous AFE unit 324-(M-1). As an example of the operation of the AFE 318 of FIG. 8A, a timing diagram of FIG. 8D show the operation of an AFE having three AFE units where each AFE unit has three channels.

Figure 8B:
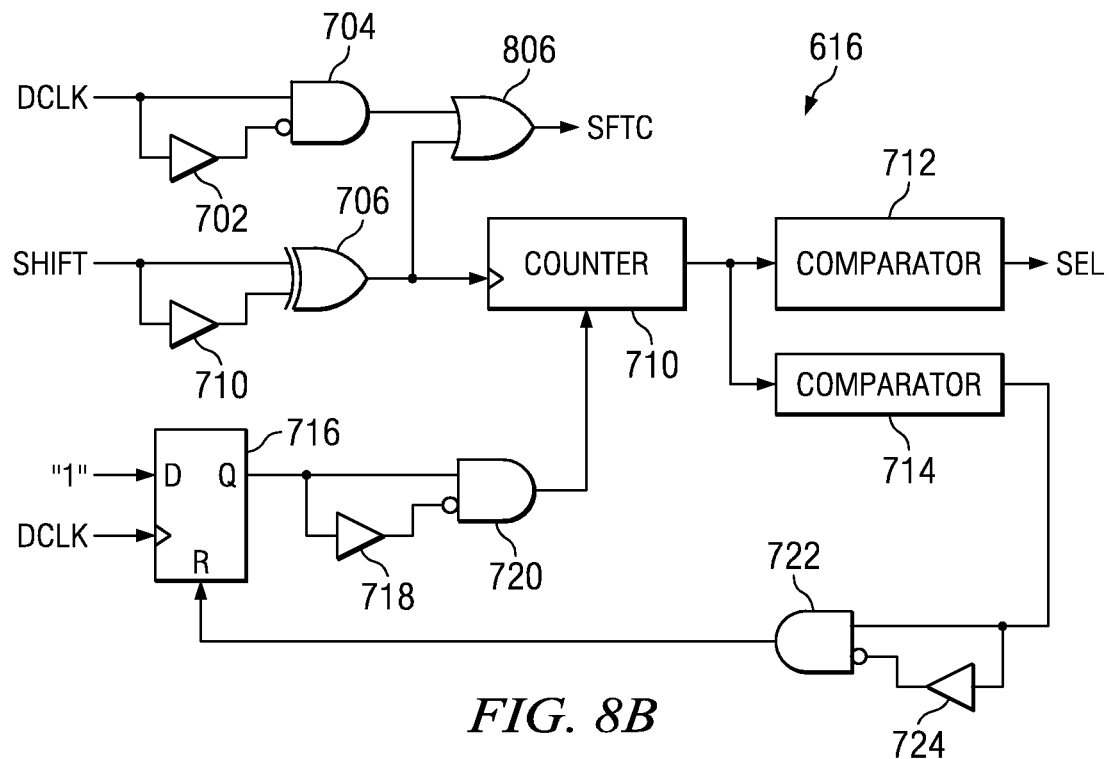

In FIG. 8B, an example of controller 616-1 to 616-(M-1) can be seen (hereinafter referred to as 616). The shift signal SHIFT from the subsequent AFE unit is provided to a delay element 710 and an XOR gate 708 so that a pulse is produced for the duration of the delay of delay element 710 after reception of a transition of the shift signal SHIFT. Additionally, the output clock signal DCLK is provided to delay element 702 and AND gate 704 so as to produce a pulse for the duration of delay element 702 at the transition from output clock signal DCLK to logic high or "1". OR gate 706 generates the clock signal SFTC based on the pulses from the XOR gate 708 and AND gate 704. D flip flop 716, delay elements 718 and 724, AND gates 720 and 722, counter 710 and comparators 712 and 714 can then generate the select signal SEL base on the pulses from XOR gate 708 and the output clock signal DCLK.

Figure 8C:
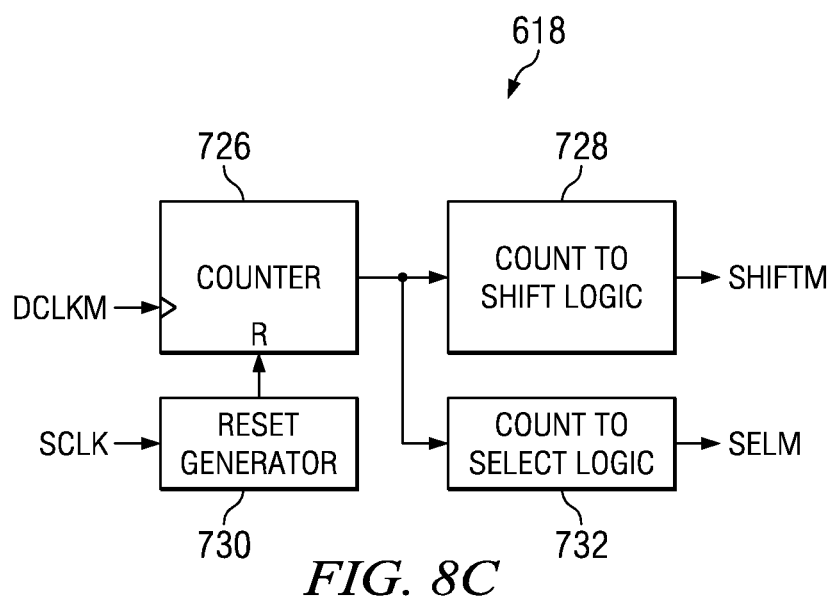
Figure 8D:
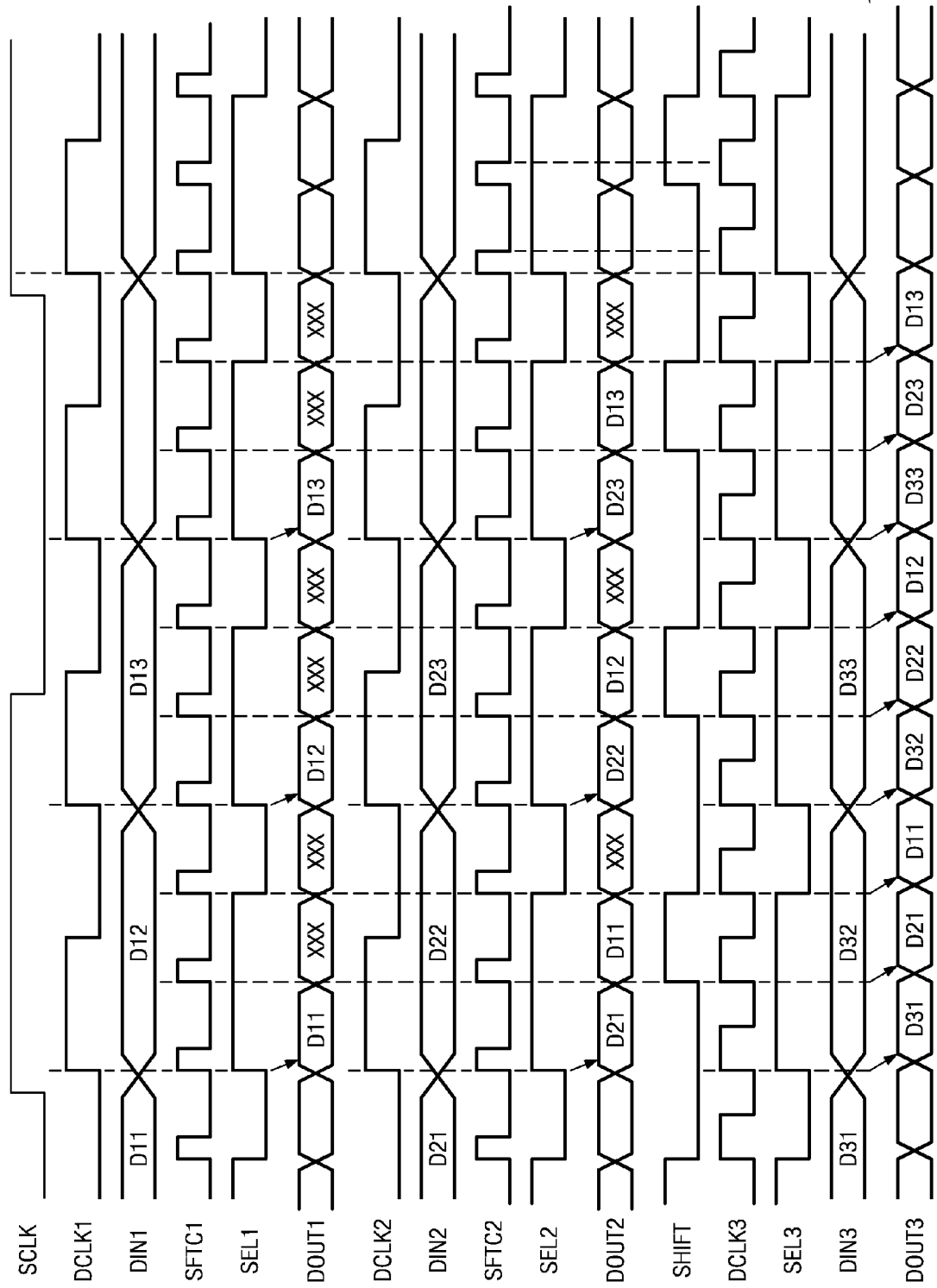
FIG. 8D is a timing diagram for the AFE of FIGS. 8A through 8C.

In FIG. 8C, an example of shift controller 618 can be seen. Shift controller 618 generally comprises a reset generator 730, a counter 726, count to shift logic 728, and count to select logic 732. Based on the output clock signal DCLKM and system clock SCLK, the shift controller is able to generate shift signal SHIFTM and select signal SELM.

Figure 9A:
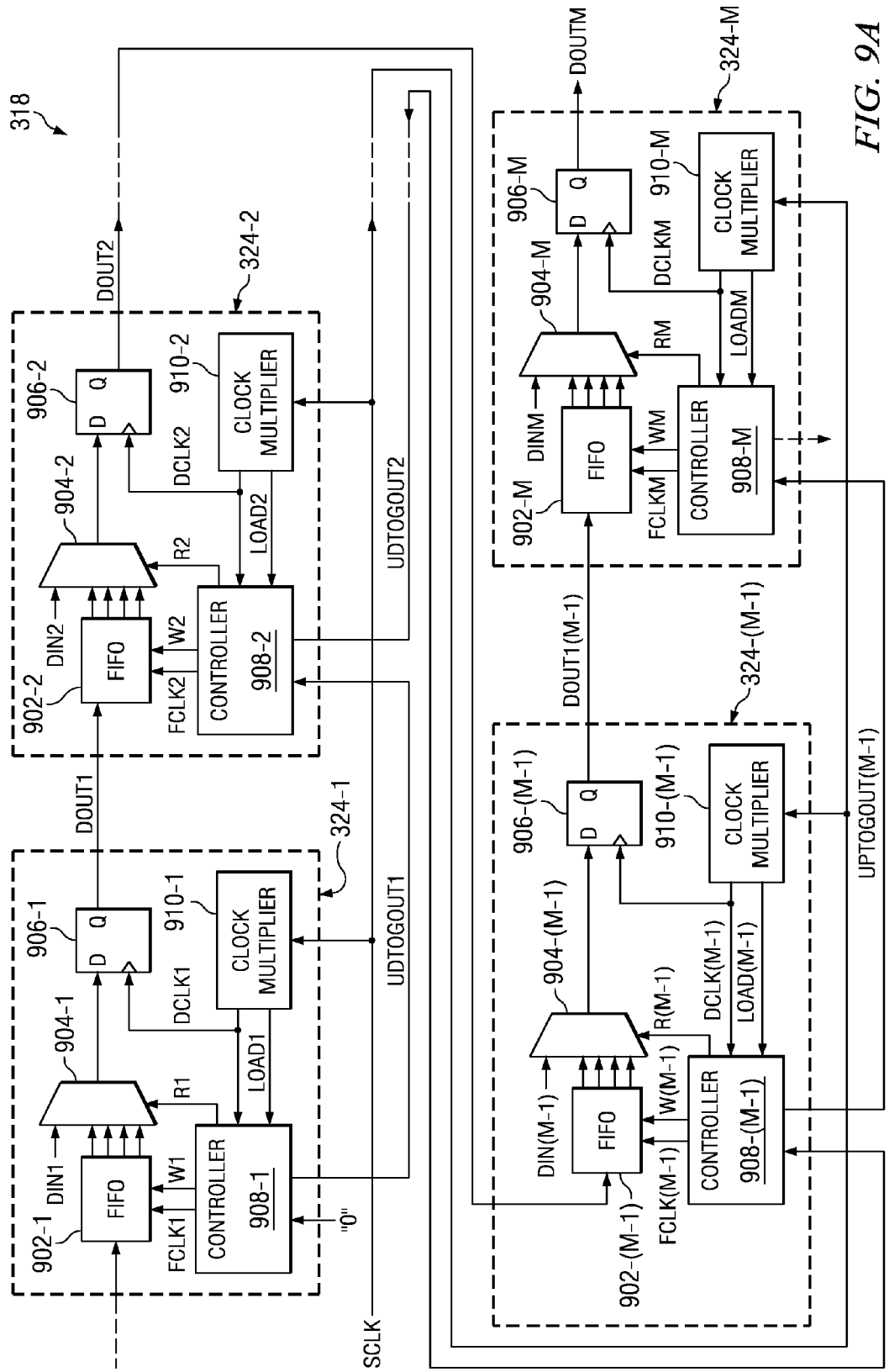
FIGS. 9A and 9B are circuit diagrams of an example of the AFE of FIGS. 3A through 3C.
Figure 9B:
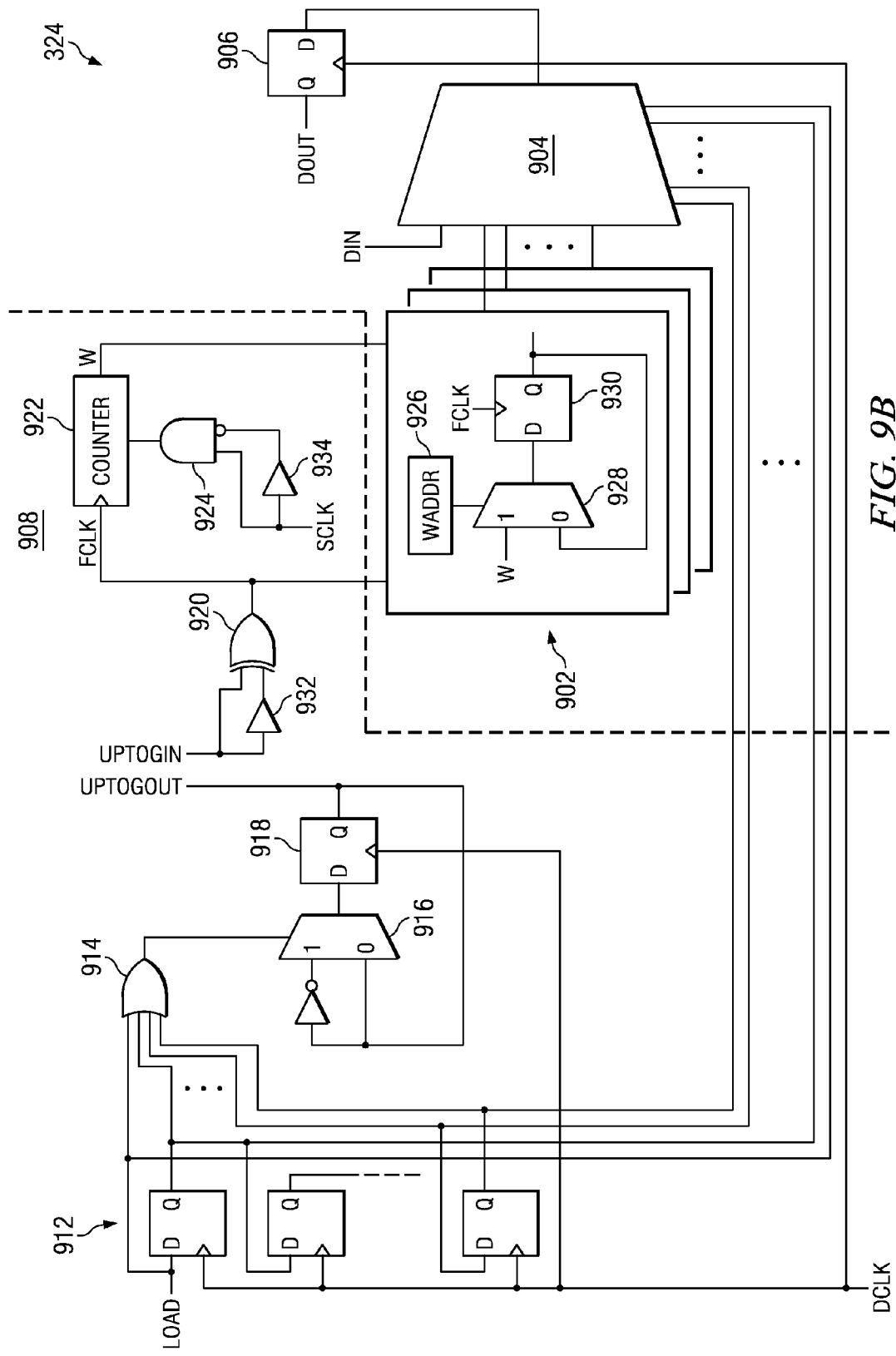
Figure 9C:
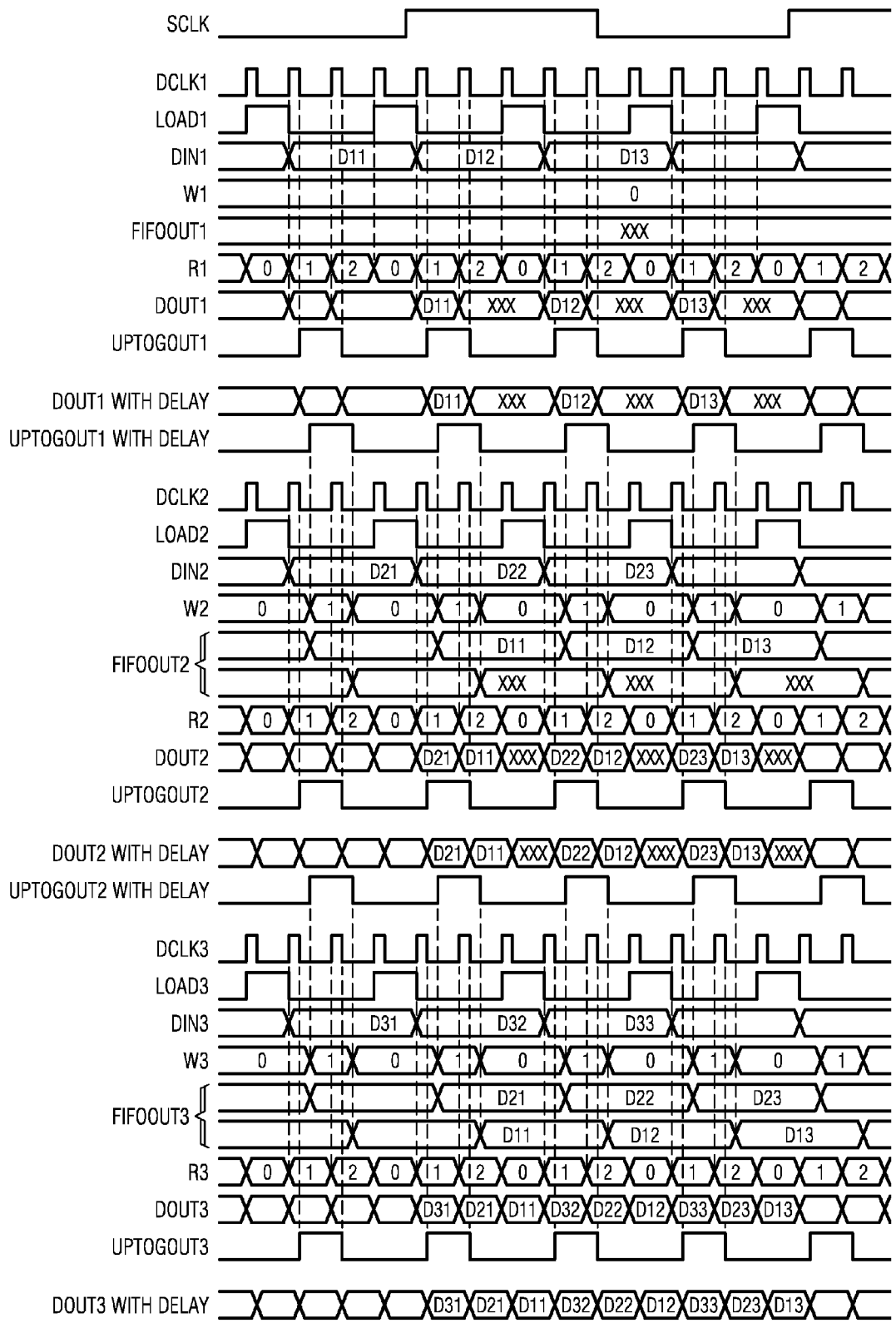
FIG. 9C is a timing diagram for the AFE of FIGS. 9A and 9B.

Turning to FIGS. 9A and 9B, an example of the AFE unit 318 of FIGS. 3A through 3C can be seen. Here each of the AFE units 324-1 to 324-M are comprised of a first-in-first-out (FIFO) circuit 902-1 to 902-M, a multiplexer 904-1 to 904-M, a D flip-flop 906-1 to 906-M, a controller 908-1 to 908-M, and a clock multiplier 910-1 to 910-M. Each controller 908-1 to 908-M is generally comprised of a ring oscillator 912, an OR gate 914, multiplexer 916, D flip-flop 918, XOR gate 920, delay elements 932 and 934, and AND gate 924. Ring oscillator 912 that receives a load signal LOAD1 to LOADM from its clock multiplier 910-1 to 910-M and that is clocked by its output clock signal DCLK1 to DCLKM. The output from each D flip-flop of ring oscillator 912 is ORed by OR gate 914 to generate a select signal for multiplexer 916 and used as the read signals R1 to RM for multiplexers 904-1 to 904-M. D flip-flop receives the output from the multiplexer 904 and the respective output clock signal DCLK1 to DCLKM, to generate the respective control signals UPTOGOUT1 to UPTOGOUTM. Control signal UPTOGOUTIN (which correspond to control signals UPTOGOUT to UPTOGOUT(M-1) from the previous AFE unit 324-1 to 324-(M-1)) is used by XOR gate 920 and delay element 932 to generate clocks signals FCLK1 to FCLKM for counter 922. Additionally, AND gate 924 and delay element 934 use the system clock signal SCLK to provide an input for counter 922. Counter then produces a write signal W1 to WM. Based on the clock signals FCLK1 to FCLKM and write signals W1 to WM, FIFO circuits 902-1 to 902-M (which each employ a write address circuit 926, a multiplexer 928, and D flip-flop 930 for each input of its multiplexer 904-1 to 904-M) respectively provide data to its multiplexer 904-1 to 904-M. An example of the operation of the AFE 318 of FIGS. 9A and 9B can be seen in FIG. 9C.

Thus, these systems 300-1, 300-2, and 300-2 (and their AFEs 318) are able to transmit data without the skew problems present in conventional systems.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
an image sensor; and
an analog front end (AFE) having:
a first AFE unit that is coupled to the image sensor through a first set of channels, wherein the first AFE unit outputs a first AFE data packet for each of the first set of channels during each cycle of a clock signal; and
a second AFE unit that is coupled to the image sensor through a second set of channels and that is coupled to the first AFE unit, wherein the second AFE unit outputs the first AFE data packet for each of the first set of channels and a second AFE data packet for each of the second set of channels during each cycle of the clock signal.

2. The apparatus of claim 1, wherein the clock signal further comprises a system clock signal, and wherein the first AFE unit outputs the first AFE packet for each of the first set of channels within the one cycle of a first clock signal, and wherein the second AFE unit outputs the second AFE packet for each of the second set of channels within the one cycle of a second clock signal, and wherein the first and second clock signals having frequencies that are integer multiples of the frequency of the system clock signal.

3. The apparatus of claim 1, wherein the first and second AFE units further comprise first and second integrated circuits (ICs).

4. The apparatus of claim 3, wherein the contact image sensor, the first AFE unit, and the second AFE unit are secured to a scanner board.

5. The apparatus of claim 4, wherein the apparatus further comprises:
a processor that is coupled to the AFE and that is secured to the scanner board;
a driver that is coupled to the contact image sensor, that is coupled to the processor, and that is secured to the scanner board; and
a communication port that is coupled to at least one of the AFE and processor and that is secured to the scanner board.

6. The apparatus of claim 5, wherein the communication port further comprises a first communication port, and wherein the apparatus further comprises:
a second communication port that is secured to a main board;
a third IC that is coupled to the second communication port and that is secured to the main board; and
a communication channel that is coupled to the first and second communication ports.

7. The apparatus of claim 6, wherein low voltage differential signal (LVDS) transmissions are provided over the communication channel.

8. The apparatus of claim 6, wherein CMOS transmissions are provided over the communication channel.

9. An apparatus comprising:
an image sensor; and
an AFE having a plurality of AFE units coupled in series with one another in a sequence, wherein each AFE has a set of channels, and wherein each AFE unit is coupled to the image sensor through its set of channels, and wherein each AFE unit outputs an AFE data packet for each of its channels and an AFE data packet from each channel of each preceding AFE unit in the sequence during each cycle of a clock signal.

10. The apparatus of claim 9, wherein each AFE unit further comprises an IC.

11. The apparatus of claim 10, wherein the contact image sensor and each of the AFE units are secured to a scanner board.

12. The apparatus of claim 11, wherein the apparatus further comprises:
a processor that is coupled to the AFE and that is secured to the scanner board;
a driver that is coupled to the contact image sensor, that is coupled to the processor, and that is secured to the scanner board; and
a communication port that is coupled to at least one of the AFE and processor and that is secured to the scanner board.

13. The apparatus of claim 12, wherein the communication port further comprises a first communication port, and wherein the apparatus further comprises:
a second communication port that is secured to a main board;
a third IC that is coupled to the second communication port and that is secured to the main board; and
a communication channel that is coupled to the first and second communication ports.

14. The apparatus of claim 13, wherein low voltage differential signal (LVDS) transmissions are provided over the communication channel.

15. The apparatus of claim 13, wherein CMOS transmissions are provided over the communication channel.

16. A method comprising:
receiving analog image data at each channel of a plurality of AFEs, wherein the plurality of AFEs are coupled in series with one another in a sequence, and wherein the last AFE of the sequence is coupled to an IC;
outputting, at about the same time, an AFE data packet from each AFE, corresponding to its first channel, to at least one of a subsequent AFE in the sequence and the IC; and
repeating the step of outputting for of the remaining channels of each AFE such that the AFE data packet for each channel of each AFE is output to the IC within one cycle of a clock signal.

17. The method of claim 16, wherein the clock signal is a system clock signal, and wherein the method further comprises generating a plurality of output clock signals, wherein the frequency of each output clock is an integer multiple of frequency of the system clock signal, and wherein each clock signal is associated with at least one of the AFEs.

18. The method of claim 17, wherein each AFE data packet is output from its corresponding AFE within one clock cycle of the output clock signal of its corresponding AFE.

19. The method of claim 18, wherein the step of outputting further comprises outputting, substantially simultaneously, the AFE data packet from each AFE, corresponding to its first channel, to at least one of a subsequent AFE in the sequence and the processor.

* * * * *